United States Patent [19]

Doughty et al.

[11] 4,142,511
[45] Mar. 6, 1979

[54] SOLAR RADIATION COLLECTOR DEVICES AND SYSTEMS

[75] Inventors: Ralph O. Doughty, Bedford; Donald W. Goodwin, Fort Worth, both of Tex.

[73] Assignee: General Dynamics Corporation, Fort Worth, Tex.

[21] Appl. No.: 798,951

[22] Filed: May 20, 1977

[51] Int. Cl.² .............................................. F24J 3/02
[52] U.S. Cl. .................................. 126/271; 126/270
[58] Field of Search ................ 126/270, 271; 237/1 A

[56] References Cited

U.S. PATENT DOCUMENTS

| 1,801,710 | 4/1931 | Abbol | 126/271 |
| 3,125,091 | 3/1964 | Sleeper, Jr. | 126/271 |
| 3,929,121 | 12/1975 | Rogers | 126/271 |
| 4,033,325 | 7/1977 | Walker | 126/271 |
| 4,067,319 | 1/1978 | Wasserman | 126/271 |

*Primary Examiner*—Kenneth W. Sprague
*Attorney, Agent, or Firm*—Charles E. Schurman

[57] ABSTRACT

Solar energy collectors, devices and systems utilizing selective solar absorbers for more efficient collection of radiant energy from the sun and its conversion to useful form at relatively high heat transfer temperatures. Each collector unit is made up solely of a closed shell-like enclosure having a continuous, unpenetrated boundary wall evacuated and hermetically sealed to form a structurally strong radiation collecting chamber whose boundary wall surrounds a rarified atmosphere environment such as a vacuum, the wall having a window portion which transmits substantially all of the received solar spectrum to a selective solar radiation absorber in the chamber and energy derived therefrom is collected at any energy collecting and transferring portion of the wall from which heat is conducted to the exterior. The chamber is wholly free of fluid passage or other structural means passing through the wall to provide a simple, long life, modular collector unit adapted to be independent of any necessary permanent connection to an associated heat transfer fluid or heat exchanger device. A high proportion of the solar radiation is absorbed in the chamber and converted to heat which can be transferred therefrom by heat conduction through the chamber wall to a heat transfer fluid moved externally over the wall. Plural collectors and their heat exchanger units can be operatively associated and interconnected to provide large area collector devices and systems.

21 Claims, 12 Drawing Figures

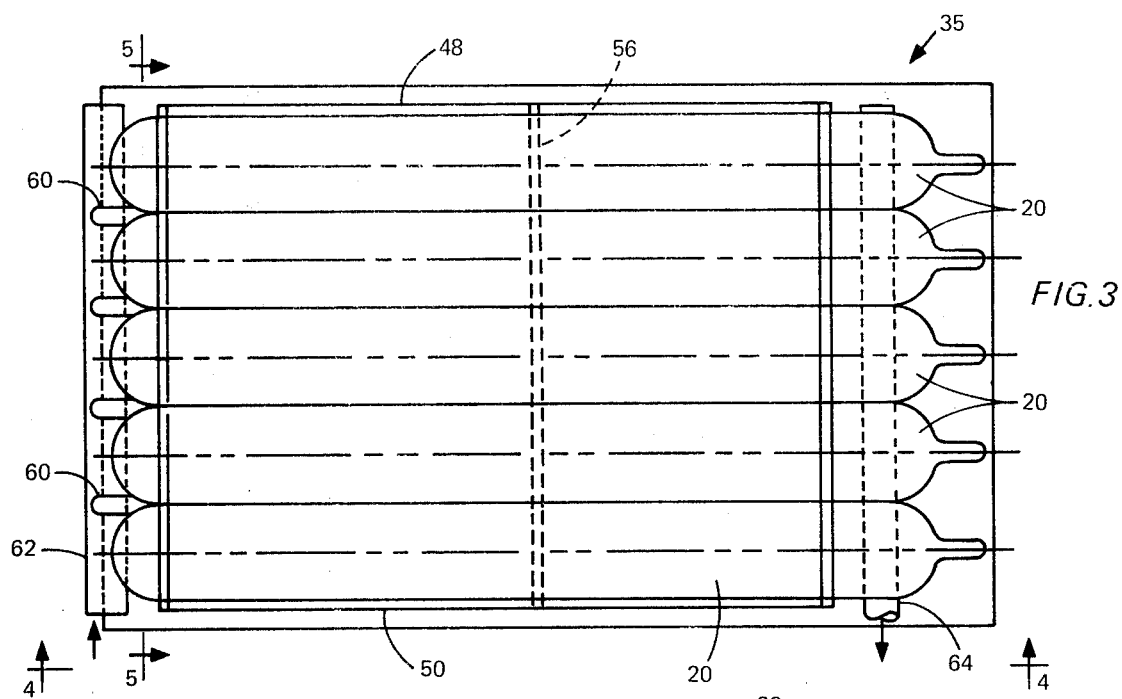
FIG. 3
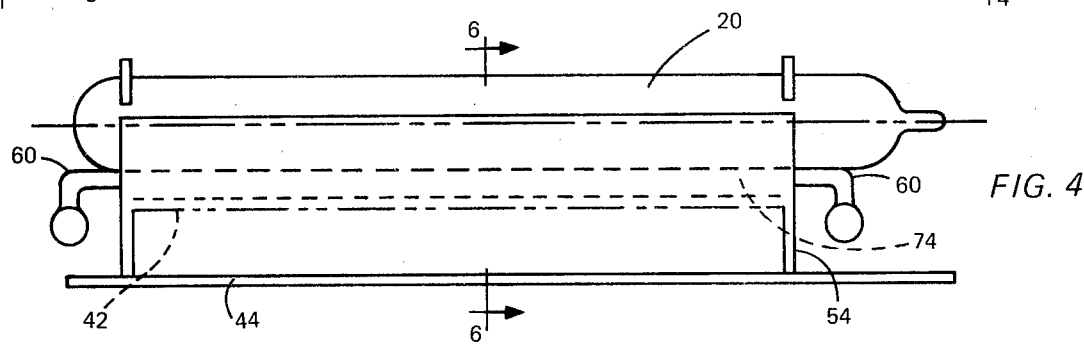
FIG. 4
FIG. 5
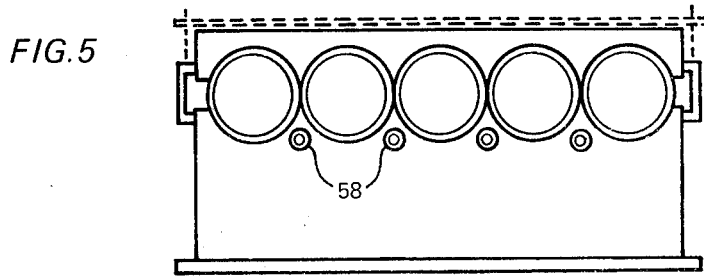
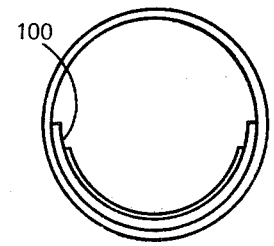
FIG. 12
FIG. 6
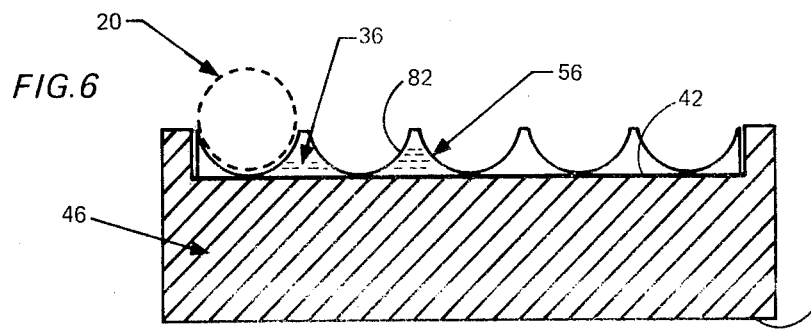

SOLAR RADIATION COLLECTOR DEVICES AND SYSTEMS

BACKGROUND OF THE INVENTION

The invention herein relates to solar radiation collectors or conversion devices adapted to gather energy from the sun and transfer collected energy to a heat transfer fluid such as air or water. A great number of such devices have been proposed. Few, if any, however, have achieved wide acceptance since they usually do not sufficiently provide the needed higher efficiencies, economical production costs, and convenience of installation, operation and maintenance to be competitive with other energy souces. Moreover, few, if any, economical and practical devices of this nature are adapted for operation at the high heat transfer fluid temperature levels needed both for greater efficiency or to produce refrigeration based on commonly available cooling systems. Examples of prior art devices may be found in the U.S. Pat. Nos. to C. G. Abbot, 1,801,710; 1,855,815; 1,946,184 and 2,141,330; B. O. Christenson No. 2,469,496 and H. P. Sleeper, Jr. No. 3,125,091.

Among other problems seen in prior art devices are their sometimes weak structural resistance to externally applied pressures, the ability to operate only at no or very low vacuum and a tendency, in those devices employing evacuated chambers to loss of vacuum, all with resultant poor efficiency. Various degrees of vacuum have been employed in solar radiation collectors to decrease heat transfer from a hot area of collection back to the ambient atmosphere. The best efficiencies are achieved with relatively high levels of vacuum, e.g., in the range of about $10^{-3}$ to about $10^{-5}$ torr. Potential vacuum loss is a serious problem since by vacuum depletion efficiency may be impaired to the point that the collector becomes effectively inoperative for its intended use. In certain known collectors the vacuum containing enclosure wall is breached or interrupted by some structure, such as a heat transfer fluid conduit which penetrates or passes through the wall to extract heat. A seal must then be provided at the place of entry of such structure and such seals, particularly over extended time periods are prone to leakage with resultant degradation of vacuum. Moreover, in such prior structures it has frequently not been possible to easily separate the radiation collector portion from the associated heat transfer fluid portions which leads to different or expensive maintenance and repair.

SUMMARY OF THE INVENTION

This invention relates to solar energy collectors, devices and systems which effectively solve many or all of the problems occasioned by the indicted deficiencies of prior known devices. The collectors of this invention provide structurally strong solar radiation collecting units which operate at relatively high heat transfer temperatures, are economical to produce, install and operate alone or in groups and systems of units associated with heat exchanger devices and are effective against the problem of loss of vacuum.

The collectors herein employ, for insolation capture and retention, selective solar radiation absorbers which provide a portion of the interior face of a hollow chamber forming the entirety of each collector unit.

As used herein, such absorbers include and may be defined as materials, layers, coatings, sheets or surfaces which exhibit a higher degree of solar radiation absorptivity ($\alpha$) than their emissivity ($\epsilon$) of long wave length or infrared radiation at the practical temperatures at which the present collector materials will operate, i.e., from about 200° F. to about 450° F. The absorbers or solar absorbers display a high absorptivity of the solar wave lengths (about 0.2 to about 3 microns) and a low emissivity at wave lengths characteristic of objects operating at a few hundreds of degrees F. (the long wave infrared ranging from about 3 to about 15 to 20 microns). In selective solar absorbers the radio of alpha ($\alpha$) to epsilon ($\epsilon$) is higher as the ability of the absorber to absorb solar radiation relative to its long wave emittance is increased. Such coatings in themselves are not new.

Glass and most clear plastics are highly selective transmitters of solar radiation, e.g., in amounts of about 90% (i.e., substantially all) of the incident radiation in the solar wave lengths, but they transmit or allow to pass through virtually no long wave infrared radiation.

The referred-to selective solar absorbers, on the other hand, are selective in their good ability to absorb solar radiation but are not good absorbers of radiation in the 3 to 20 micron wave length range. Being poor absorbers in this range, they are poor emitters of such radiation when their temperature is less than several hundred degrees F. As a consequence, they inefficiently re-radiate energy derived from the sun back to their surroundings.

In achieving the present invention, it has been found that such selective solar radiation transmitters and absorbers can be adapted to use with a sealed cell-like chamber having an unpenetrated continuous boundary or enclosing wall for containing a relatively high order of vacuum therein to make the chamber effective to capture a high percentge of incident solar radiation while substantially preventing re-radiation to the ambient exterior. As a result, a significant percentage of the captured radiation can be transferred from the chamber as energy to a heat transfer medium passed only externally over the chamber wall. Accordingly, the invention contemplates a hermetically sealed chamber evacuated to contain a rarified atmosphere environment the chamber being formed solely by a continuous or unpenetrated wall having a window wall portion substantially transparent to incident solar radiation and an energy collecting wall portion heated by energy derived from a selective solar radiation absorber in the chamber. The absorber is adapted to convert received insolation to heat and transfer it to the collector portion of the boundary wall from where it can be transferred to the chamber exterior. Heat is thus removed from the collector by conduction through a portion of the wall forming the boundary of the evacuated region.

Various fluid media may be passed in heat transfer relation to the exterior of the energy collecting wall portion of one or more collector units by using fluid-containing heat exchanger devices so as to carry off the transferred heat to do useful work. Also, a plurality of such chambers, each forming an energy collector or collector unit when operatively associated with suitable heat transfer structures for moving a heat transfer fluid thereover to provide collector devices of increased radiation absorbing surface area. Larger systems containing a plurality of such devices can be massed for even larger energy collection.

The sealed collector units of the invention are configured and constructed to retain a high degree of vacuum environment therein, e.g., by a container formed as a thin walled hollow bubble or cylinder-like shell or comparable shape of solar radiation transparent glass or plastic material. Advantageously, the solar absorptive surface is provided on the interior face of the energy collecting portion of the boundary wall being thus or otherwise partly covered over so only a portion of the wall is left transparent to form the solar radiation transmitting window or window wall portion of the chamber boundary wall and generally opposite to the collecting portion. The solar absorptive surface is a highly selective solar radiation absorber as described above which provides the collector with a solar radiation receiver and energy converter. Insolation entering the chamber first passes through the window portion then through the vacuum to the receiver or absorber. A high proportion is absorbed at its absorptive surface and converts therein to heat.

Certain embodiments can advantageously provide collector devices adapted to use gaseous heat transfer fluid, or the collector absorber to be spaced from the collecting portion or to have at its marginal areas highly solar reflective material to increase insolation impingement on the absorber.

BRIEF DESCRIPTION OF THE DRAWINGS

The above and further objectives and advantages of the invention will become more apparent from attention to the annexed drawings and description of preferred embodiments, when taken in light of the foregoing, and which are only presented as illustrative and not as limitative thereof, and in which:

FIG. 3 is a top plan view of the collector device of FIG. 2;

FIG. 4 is a side view in elevation of the device of FIG. 3 taken along line 4—4;

FIG. 5 is an end view of the device of FIG. 3 taken along line 5—5 thereof;

FIG. 6 is an cross section view in elevation of the device of FIG. 3 taken along line 6—6 thereof only one of the collectors being shown;

FIG. 12 is a cross sectional view of a modified form of the collector unit.

DESCRIPTION OF THE PREFERRED EMBODIMENTS

Figure 1:
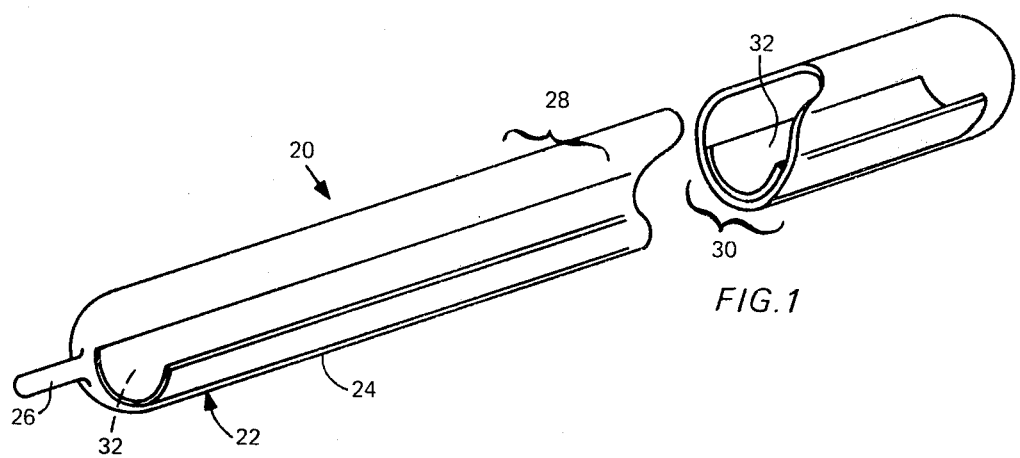
FIG. 1 is a view in perspective of a collector or collector unit of the invention showing the chamber boundary wall cut away to reveal a solar radiation absorptive surface or solar absorber therein.

Referring to the drawings, a collector or collector unit 20 of this invention is seen in FIG. 1. In this illustrated embodiment the collector is an elongated hollow, thin walled cylindrical chaber 22 fabricated of a highly solar radiation transparent glass material and closed at both ends. The chamber is thus seen to have a continuous boundary wall 24 which is wholly free of any structure penetrating or inserted therethrough. This construction adapts the chamber to have considerable structural strength and to be evacuated to a high degree and hermetically sealed at 26 after evacuation thus to contain a rarified atmosphere or vacuum environment retainable therein without loss through defective seals or the like.

The upper approximately 180° of revolution of the cylinder provides a solar spectrum transparent window portion 28 of the boundary wall which remains tranparent to solar radiation at all times for transmission therethrough of a high proportion of the insolation or solar radiation incident on the chamber. The lower approximately 180° of revolution of the cylinder provides the chamber with an energy collecting portion 30 of the chamber boundary wall generally opposite the window wall portion and from which energy derived from the solar radiation entering the chamber may be transferred to the chamber exterior both by conduction and radiation and convection.

Positioned in the chamber between the window wall portion and the energy collecting portions of the boundary wall is a highly selective solar spectrum absorptive surface or solar absorber 32 functioning to absorb a high proportion of the solar radiation received thereon from the window wall portion and convert the radiation to thermal energy and transfer it by radiation or conduction to the collecting wall portion 30.

Figure 2:
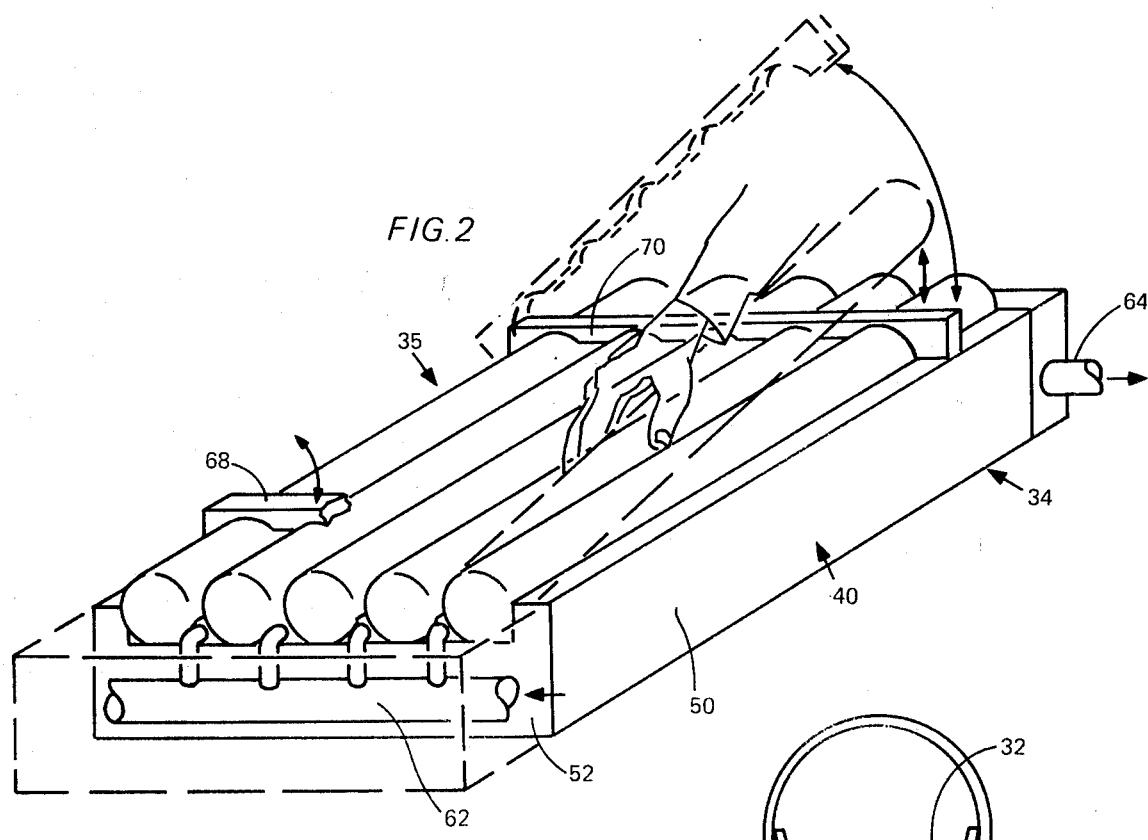
FIG. 2 is a view in perspective of a collector device of this invention showing a plurality of collector units operatively associated with a supporting heat exchanger structure.

As indicated in FIG. 2 one or a plurality of the collector units of FIG. 1 may be supported in a heat exchanger structure 34 to provide a collector device 35 adapted to pass a heat exchange fluid 36 such as water over the energy collecting portion of the unit for removing heat therefrom and passing the heated fluid to a location where energy therefrom can be given up to known devices (not shown) for doing useful work.

Some of the characteristics which differentiate the present invention from prior devices using evacuated tubes sealed without penetration may be appreciated by considering the various paths of energy flow in the collectors and devices taught herein. Considering an incident ray from the sun as striking the upper surface of the collector of FIG. 1 a very small portion of the ray is reflected from the upper surface and is lost. Another small portion of the ray is absorbed in the tube wall but the major portion is transmitted through the window wall portion 26 of the cylinder or tube and strikes the selective solar absorber 32. A very small portion of the ray is reflected from the absorber some of which may be captured elsewhere in the chamber than the point of incidence and a very small portion may be lost back through the chamber boundary wall. The solar absorber being highly selective, it retains by far the major portion of the ray energy received which heats the absorber. The heated absorber then contains thermal energy which may be conducted therefrom and it is also caused to radiate heat in the far infrared wave lengths but the selective surface being a poor emitter in these wave lengths, relatively little energy is thus radiated back to the inside surface of the window wall portion. However, the characteristics of the glass prevent most of this radiation from escaping although some heat from the window wall portion is transferred by convection to the surroundings. The principal energy loss mechanism is due to heat conducted in the wall of the chamber from the collector portion to the window portion and thence loss to ambient. Substantially no heat is transferred from the absorber back to the window portion by convection due to the presence of the rarified atmosphere of the chamber. The remainder (a significant proportion) of the absorbers' heat is available to be transferred to the collecting wall portion 30 by conduction where they are in immediate contact, or radiation in regions of poor contact, thus heating the collecting wall portion.

Referring further to the collector device 35 of FIG. 2, further illustrated in FIGS. 3, 4, 5 and 6. The exchanger has a body portion 40 constructed as an open top rectangular box closed on the bottom, sides, front and back. The body has inner and outer bottom walls 42 and 44 supported by thick insulation 46. Upstanding therefrom are sides 48 and 50 and ends 52 and 54 joined to the sides. Each of the ends has a scalloped out upper edge whose curvatures exactly match the outer circular dimension of the solar collector units for supporting the ends of the collectors as shown. An additional scalloped out support 56 supports the central portion of the collectors. Defined through each of the ends 48 and 50 are a plurality of fluid transfer ports 58 to which are connected nipples 60 leading to inlet and outlet headers 62 and 64 respectively for passage into an out of the heat exchanger of a heat transfer fluid 66, preferably water. Releasable clamps 68 and 70, which may be hinged at one side and lockable at the other, are provided over the upper surface of the heat exchanger for holding a plurality of the collector units 20 in tight covering relation to and over the upper portion of the heat exchanger body. With the units so positioned, they form the upper exposed surface of the collector device and provide with the body 40 a fully enclosed space 74 for containing and circulating the heat transfer fluid in contact with the underside of the collectors. The fluid 66 may thus be circulated by a circulator device (not shown) into inlet header 62, through the inlet nipples into space 74 into contact with the hot energy collecting portion of the collectors. from the heat exchanger interior space 74 the now heated fluid is moved through outlet nipples 58 into outlet header 62 and thence to another location of heat transfer (not shown) to give up its heat as desired.

It will be appreciated that various sealing gaskets and spacers may appropriately be positioned between adjacent collector units or elsewhere between portions of the collectors and the heat exchanger as required to make effective sealing against heat transfer fluid leakage.

A plurality of collector devices 20 can be coupled together by operatively interconnecting the outlet header of one collector device 35 to the inlet header of a like collector device, and so on to form a system for gathering solar energy over a substantial surface area. The depiction is schematic and in practice the devices are close together.

Figure 8:
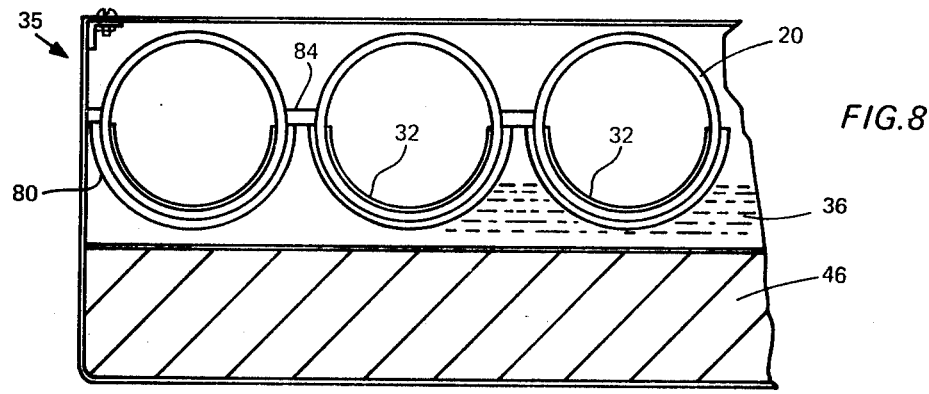
FIG. 8 is a cross sectional view in elevation of a collector device in which the collector units are positioned in a heat exchanger structure, each unit cradled on a contoured upper surface of the heat exchanger portion.

FIG. 8 shows a modified form of heat exchanger similar to that of FIGS. 2 through 6 but modified to provide a continuous upper heat exchanger cover 80 or its upper surface contoured with parallel troughs 82 for receiving and supporting the individual collector units. Friction or spacer strips 84 may be provided to snug or position the units in the troughs. With this embodiment heat is transferred from the collecting portion of the chamber to the metal heat exchanger cover, which may involve both conductor and radiation, and thence to heat exchange fluid 66. A heat sink compound, such as a silicone grease can advntageously be applied between the collector units and the cover 80 to enhance heat transfer.

Figure 9:
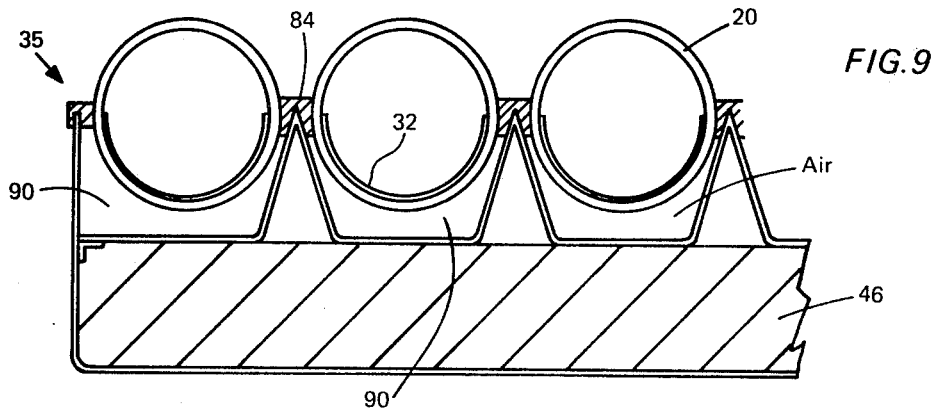
FIG. 9 is a cross sectional view in elevation of another form of collector device using air as the heat exchange fluid.

The embodiment of FIG. 9 is a collector device similar to those of FIGS. 2 through 8 but particularly adapted for use with air to be passed as the heat transfer fluid in passageways 90 closely about the energy collecting portions 30 of the individual collector units.

Figure 10:
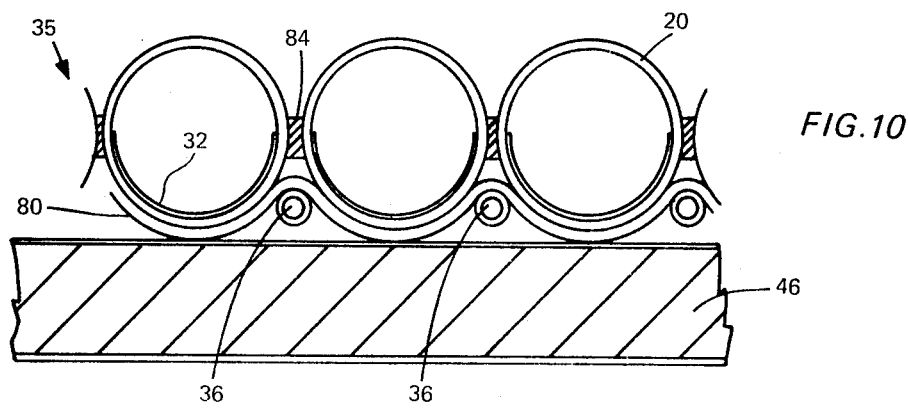
FIG. 10 is a cross sectional view in elevation similar to FIG. 8 showing a collector device utilizing another form of heat exchanger structure.

FIG. 10 depicts a preferred embodiment of the collector device, having a heat exchanger similar to that of FIG. 8 except that small fluid conduit tubes 96 are integrally joined to the upper cover 80 of the heat exchanger structure between adjoining collector units for carrying the heat therefrom and the spacer strips are spaced from the cover leaving an air gap between.

Figure 11:
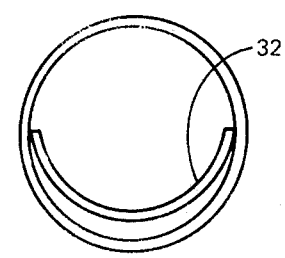
FIG. 11 is a cross sectional view of a collector unit having the solar absorptive surface in spaced relation to the interior face area of the energy collecting portion of the chamber boundary wall.
Figure 7:
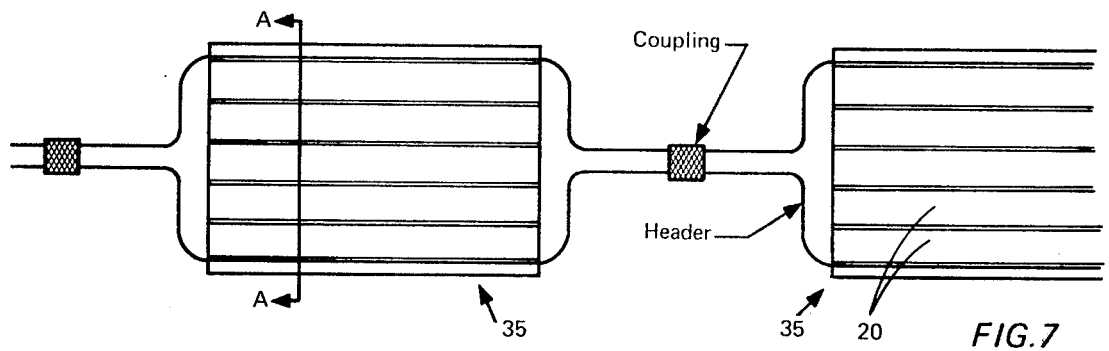
FIG. 7 is a schematic plan view of a plurality of the devices of FIG. 3 operatively interconnected to form a system of collector devices for increased insolation reception.

FIG. 11 depicts an alternate embodiment of a collector unit of the invention in which the solar absorber 32 is positioned within the chamber 22 spaced from collector wall portion of the chamber except at its supporting margins. In this embodiment heat from the absorber is transferred primarily by radiation to the chamber boundary wall at its collector portion, since the selective coating or absorbing surface is only on the side exposed to the sun.

FIG. 12 shows a further alternate embodiment of a collector unit in which the solar absorber is positioned centrally over the interior face of the collector portion to cover less than 180° of the chamber wall. Along each marginal border area of the absorber there is a strip or margin 100 of highly reflective material such as bright gold, or the like. This construction provides an increased pathway for conduction losses from the absorber to the window portion and thence to ambient with some compensation provided by reflection of transmitted insolation onto the absorber. The embodiment is particularly effective where the plane of the collector device is normal to the incident solar radiation.

A number of different solar absorber materials are available which can be used. Among these are chromic oxide on aluminum and substances known as "black nickel" and "black chrome".

With the collectors of this invention suitable highly selective solar radiation absorbers or solar absorbers have been found to yield excellent results when the ratios of absorbtivity to long wave infrared emissivity is such that alpha is at least about 0.65 or above and epsilon is in the range of about 0.15 or less. Good results are obtainable when alpha is in the range of from about 0.5 to about 0.8 and emissivity is in the range of about 0.15 to about 0.3 each on a scale of 0 to 1.

It will be appreciated that when the horizontal plane of the collectors is normal to incident solar radiation high efficiency is derived when the solar absorber extends throughout close to 180°, e.g., the lower half of the collector unit.

It will be further appreciated that with the collectors of the invention the combination of a single wall chamber in which a selective solar absorber is spaced by a vacuum from a window wall portion transmitting solar radiation thereto and the absorber positioned to transmit heat to an energy collector portion of the chamber wall, there is provided excellent absorption of solar radiation and a low degree of infrared heat loss. Moreover, where the chamber is a thin glass wall, the wall offers little resistance to radial heat flow from the collecting portion to a heat transfer fluid external thereof but offers high resistance to heat flow circumferentially from the collecting portion to the window wall portion. In addition, the vacuum eliminates convective heat loss from the absorber or the collecting portion to ambient through the window wall portion. Similarly the low emittance absorbers, which may be coatings, on the interior face of the collecting portion, greatly reduces radiation heat loss from the absorber to the window wall portion or front or upper side of the chamber.

The collectors herein being unpierced through the wall thereof provide for maintenance of high leels of vacuum therein as well as preventing degradation of the absorber materials and their consequent long life thereby maintaining the heat transfer efficiency of the collector unit over long periods. It has been found possible with the invention to provide heat tranfer fluid temperatures in the area of from about 200° F. to about 300° F. which allows for use with refrigeration devices as well as for heating. Suitable heat transfer fluids may be water, ethylene glycol, air, or similar substances.

When a hard vacuum is not desired within the chamber the vacuum may be a mild vacuum on the order of about 1 to about 3 torr or as low as about 5 torr in which case it is beneficial to provice within the chamber a transparent gas such as for example neon, carbon dioxide, freon 12, benzene, and others. Such gases have a low thermal conductivity and provide a low convective rarified environment. Where a hard vacuum, i.e., up to perhaps $10^{-5}$ torr is used both conduction and convection are very low between back to front walls of the chamber or from the absorber to the front wall via the interior space.

It will be appreciated that the tube-like or tubular construction, coupled with the rigid nature of the glass material used, at once provides for the desired thin-wall but strong collector capable of sustaining the atmospheric loads resulting from use of the indicated degrees of vacuum or rarified atmosphere It is understood that various changes and modifications can be made without departing from the spirit and scope of the claims.

What we claim is:

1. A solar energy collector substantially of the non ray-concentrating type comprising:
   (a) a solar energy collecting chamber in the form of an elongated hollow tube having closed ends, the chamber adapted to receive and have absorbed therein a high degree of solar radiation incident thereon;
   (b) the chamber having a continuous, rigid, hermetically sealed boundary wall defining an interior space adapted to maintain a rarified atmosphere environment therein of the order of mild to high levels of vacuum and the wall capable of sustaining resulting atmospheric pressure loads thereon;
   (1) said chamber boundary wall having a solar spectrum transparent window portion along the length of said tube for transmission therethrough of a high proportion of the solar radiation incident on said window portion into said interior space without substantial concentration or focusing of said rays; and
   (2) a solar energy collection portion of said boundary wall along the length of said tube generally opposite said window wall portion for collecting and transferring energy derived from said transmitted radiation by heat conduction through said collecting wall portion to a heat transfer fluid passed externally of said chamber;
   (c) the chamber containing a selective solar spectrum absorptive surface adapted to absorb a high proportion of the solar radiation received thereon and convert it to thermal energy and transfer it to said collecting wall portion;
   (d) the absorptive surface having a solar radiation absorptivity substantially greater than its emissivity of long wave infrared radiation; and
   (e) a rarified atmosphere environment contained within said chamber to substantially eliminate convective heat transfer from said absorptive surface to said transparent window portion.

2. The solar energy collector of claim 1 in which said chamber wall is glass.

3. The solar energy collector of claim 1 in which said chamber wall is plastic.

4. The solar energy collector of claim 1 in which said chamber is a closed cylinder-like tube.

5. The solar energy collector of claim 1 in which said rarified atmosphere environment is a mild vacuum on the order of about 1 to about 3 torr and said vessel has therein a transparent gas of low thermal conductivity.

6. The solar energy collector of claim 5 in which said gas is selected from the group consisting of the freons, methyl chloride, carbon tetrachloride, neon, chloroform, benzene and carbon dioxide.

7. The solar energy collector of claim 1 in which said rarified atmosphere environment also provides a low degree of gaseous conduction therethrough.

8. The solar energy collector of claim 1 in which said rarified atmosphere environment is a hard vacuum on the order of about $10^{-3}$ torr or greater vacuum to substantially eliminate heat-conduction losses through the interior space of said chamber from the absorptive surface to said window portion.

9. The solar energy collector of claim 1 in which said surface is texturized for providing a high ratio of solar radiation absorptivity to long wave infrared emissivity.

10. The solar energy collector vessel of claim 1 in which said surface is layered and has a thin layer of generally nonreflective material for absorbing solar radiation and converting a high proportion of said radiation to thermal energy, said nonreflective layer overlaid upon a layer of material substantially non-emittive of radiation in the long wave infrared range.

11. The solar energy collector of claim 1 in which said surface has a solar radiation absorptivity greater than about 0.6 and a ratio of solar radiation absorptivity to long wave infrared emissivity greater than about 2.

12. The solar energy collector of claim 1 in which said solar radiation absorptive surface is one or more metals deposited on the interior face of the chamber boundary wall.

13. The solar energy collector of claim 1 in which said solar spectrum absorptive surface is provided as a thin sheet in heat exchange relation to said energy collecting portion of the chamber boundary wall.

14. The solar energy collector of claim 13 in which said thin sheet has a thin layer of heat sink material between it and the interior face of the chamber boundary wall for enhancing heat transfer from the sheet to the collecting wall portion of the chamber.

15. The solar energy collector of claim 1 in which said absorptive surface is provided at the interior face of said energy collecting portion of the boundary wall.

16. The solar energy collector of claim 1 in which said absorptive surface is provided in spaced relation to said energy collecting portion of the boundary wall.

17. The solar energy collector of claim 1 in which the selective solar absorber has along each margin thereof a highly solar reflective material to increase insolation impingement on the absorber.

18. The solar energy collector of claim 1 in which said window portion and said energy collecting portion each extend over about one half of the boundary wall area of said tube between the ends thereof.

19. The solar energy collector of claim 1 in which said absorptive surface extends over about one half of the boundary wall area of said tube between the ends thereof.

20. The solar energy collector of claim 1 which produces temperatures in the range of from about 200° F. of about 300° F. in a heat transfer fluid passed in heat transfer relation to said collecting wall portion only externally of said chamber boundary wall.

21. A solar energy collector device substantially of the non ray-concentrating type cmprising:
  (a) a plurality of individual solar energy collecting chambers each in the form of an elongated hollow tube having closed ends and adapted to receive and have absorbed therein a high degree of solar radiation incident thereon;
  (b) said chambers each having a continuous, rigid, hermetically sealed boundary wall defining respective interior spaces each adapted to maintain a rarified atmosphere environment therein;
    (1) said chamber boundary walls each having a solar spectrum transparent window portion along the tubular length thereof for transmission therethrough of a high proportion of the solar radiation incident of said window portion into said interior space without substantial concentration or focusing of said rays; and
    (2) a solar radiation collecting portion of each said boundary wall along the tubular length thereof generally opposite the respective window wall portions for collecting and transferring energy derived from said transmitted radiation by heat conduction through said collecting wall portions to a heat transfer fluid passed externally of said chamber.
  (c) each chamber containing a selective solar spectrum absorptive surface adapted to absorb a high proportion of the solar radiation received thereon and convert it to thermal energy and transfer it to said collecting wall portion;
  (d) each of the absorptive surfaces having a solar radiation absorptivity substantially greater than its emissivity of long wave infrared radiation;
  (e) a rarified atmosphere environment contained within each of the chambers to substantially eliminate convective heat transfer from said absorptive surfaces to said transparent window portions; and
  (f) said chambers being juxtaposed in operative association with a heat exchanger structure adapted to contain and pass a heat transfer fluid in heat transfer relation to the exterior face of said radiation collecting wall portions of the chambers for carrying off heat collected therein.

* * * * *